United States Patent
Henning et al.

(10) Patent No.: US 7,761,630 B2
(45) Date of Patent: Jul. 20, 2010

(54) APPLICATION PROGRAMMING INTERFACE FOR FUSION MESSAGE PASSING TECHNOLOGY

(75) Inventors: Brett Henning, Colorado Springs, CO (US); Brad Davis, Colorado Springs, CO (US); Scott Dominguez, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 1109 days.

(21) Appl. No.: 11/148,395

(22) Filed: Jun. 7, 2005

(65) Prior Publication Data

US 2006/0277553 A1 Dec. 7, 2006

(51) Int. Cl.
 G06F 13/42 (2006.01)
 G06F 9/44 (2006.01)
(52) U.S. Cl. ............. 710/105; 707/8; 707/201; 707/203; 709/230; 709/224; 715/229; 717/121; 717/122; 717/123; 717/124
(58) Field of Classification Search .......... 707/203; 710/105
 See application file for complete search history.

(56) References Cited

U.S. PATENT DOCUMENTS

| | | | |
|---|---|---|---|
| 5,446,884 A | 8/1995 | Schwendemann et al. | 395/600 |
| 5,594,863 A | 1/1997 | Stiles | 395/182.13 |
| 5,734,895 A | 3/1998 | Matsuo | 395/618 |
| 5,867,736 A * | 2/1999 | Jantz | 710/74 |
| 6,842,792 B2 * | 1/2005 | Johnson et al. | 710/5 |
| 6,996,670 B2 * | 2/2006 | Delaire et al. | 711/114 |
| 7,054,972 B2 * | 5/2006 | Parry et al. | 710/260 |
| 7,080,140 B2 * | 7/2006 | Heitman et al. | 709/224 |
| 7,120,652 B2 * | 10/2006 | Maslowski | 707/203 |
| 7,155,569 B2 * | 12/2006 | Johnson et al. | 711/114 |
| 2002/0194380 A1 | 12/2002 | Sullivan et al. | 709/246 |
| 2003/0046606 A1 | 3/2003 | Johnson et al. | 714/25 |
| 2003/0097554 A1 * | 5/2003 | Cheston et al. | 713/2 |
| 2003/0149769 A1 * | 8/2003 | Axberg et al. | 709/225 |
| 2003/0212784 A1 | 11/2003 | Nguyen | 709/224 |
| 2003/0236919 A1 * | 12/2003 | Johnson et al. | 709/251 |
| 2004/0003144 A1 * | 1/2004 | Johnson et al. | 710/5 |
| 2004/0102978 A1 * | 5/2004 | Gygi et al. | 704/275 |
| 2004/0117534 A1 * | 6/2004 | Parry et al. | 710/260 |

OTHER PUBLICATIONS

LSI Logic's Fushion-MPT Architecture—(Dated 2002 per the submitted IDS on Jun. 7, 2005)—4 pages.*
LSI Logic's Integrated RAID Solutions, 2003.
LSI Logic's Fusion-MPT Architecture, 2002.
LSI Logic's Integrated RAID, User's Guide, Version 1.0—Preliminary, Jul. 2003.

* cited by examiner

*Primary Examiner*—Mark Rinehart
*Assistant Examiner*—Brian T Misiura
(74) *Attorney, Agent, or Firm*—Kermit D. Lopez; Luis M. Ortiz; Ortiz & Lopez, PLLC

(57) ABSTRACT

A data-processing system and method are disclosed, which generally includes a plurality of components connected to a bus within a data-processing apparatus utilizing one or more input/output interfaces (e.g., IOCTL) in communication with the bus. A dynamic interface is implemented, which includes a plurality of interface modules that permits varying data-processing applications to scan, identify and interface with the plurality of components utilizing the input/output interface, thereby increasing data-processing application development efficiency relative to one or more components within the data-processing system.

17 Claims, 3 Drawing Sheets

APPLICATION PROGRAMMING INTERFACE FOR FUSION MESSAGE PASSING TECHNOLOGY

TECHNICAL FIELD

Embodiments are generally related to data-processing methods and systems. Embodiments are additionally related to Input/Output control methods and systems and message passing technology (MPT). Embodiments are particularly directed to methods and systems for abstracting an interface to a driver, firmware associated with a controller, and/or devices associated with a system bus.

BACKGROUND OF THE INVENTION

In a conventional data-processing system, such as a computer and/or a computer network, one or more processors may communicate with input/output (I/O) devices over one or more buses. The I/O devices may be coupled to the processors through an I/O interface such as an I/O bridge, which can manage the transfer of information between a peripheral bus connected to the I/O devices and a shared bus connected to the processors. Additionally, the I/O interface may manage the transfer of information between system memory and the I/O devices or the system memory and the processors.

An I/O interface can also be utilized to transfer information between I/O devices and main storage components of a host processor. An I/O channel, for example, may connect the host directly to a mass storage device (e.g., disk or tape drive). In the case of a mainframe host processor, the channel is usually coupled to one or more device controllers. Each device controller can in turn be connected to a plurality of mass storage devices.

One example of an I/O interface that has become widely utilized in the data processing and computer arts is the so-called "Fibre Channel." In general, features of both channels and networks have been incorporated into a network standard known as "Fibre Channel," which has been defined by American National Standards Institute (ANSI) specifications, such as X3.230 (1994). Fibre Channel systems attempt to combine the speed and reliability of channels with the flexibility and connectivity of networks.

In general, data in a Fibre Channel network can be transported in packets, which may be two kilobytes or smaller. These packets of data can be referred to as "frames." "Sequences" include one or more frames. Frames in a sequence are generally assembled at the receiving device in a predetermined order before the sequence can be considered complete.

Fibre Channel is a campus-wide interconnection standard that is designed primarily to interconnect peripherals, mass storage systems such as redundant arrays of inexpensive disks (RAID), imaging and archiving systems, mainframes, engineering workstations, and other high-speed devices. Often seen as the successor to the Small Computer Serial Interface (SCSI) standard, Fibre Channel is a high-speed channel that typically uses fiber optics to interconnect computing devices in a relatively local environment, such as a laboratory or a campus. Thus, the Fibre Channel focuses more on providing bandwidth between devices than a completely flexible network. Fibre Channel is a switched technology.

The Fibre Channel interface dedicates circuits for transferring data while allowing other devices to access the channel when it is free. The Fibre Channel interface supports variable length transmissions; it can transmit large blocks of data without dividing the blocks into smaller packets. The speed of Fibre Channel is in the range of 133 Mbit/sec-1062 Mbit/sec. While multimode optical fiber is used most often, single mode optical fiber, coaxial cable, and shielded twisted pair wire are also occasionally used in practice. An example of a Fibre Channel method and system is disclosed in U.S. Pat. No. 6,721,320, which issued on Apr. 13, 2004 to Hoglund et al and is assigned to LSI Logic Corporation based in Milpitas, Calif. U.S. Pat. No. 6,721,320 is incorporated herein by reference.

Another well-known I/O interface is Serial Attached SCSI (SAS). SAS incorporates feature of Small Computer System Interface (SCSI), also known as "skuzzy", which is a bus protocol that allows various internal and external devices to be connected to personal computers, workstations, servers, and/or other data-processing systems. SAS is a is a point-to-point architecture, distinct from parallel technologies in which devices are connected utilizing shared-access topologies, such as a Fibre Channel arbitrated loop of the SCSI bus. As such, a point-to-point architecture establishes a link directly from the controller to a disk drive or through an expander-switching matrix. In shared-access topologies, only two devices can communicate at once. As well, as throughput needs increase, the shared-access medium can become a bottleneck and slow down communication. Shared access topologies also are typically more complex and have arbitration schemes that are more time consuming than point-to-point architectures.

When communicating between a user mode application in a modem operating system (OS) and a storage controller, applications typically rely upon I/O Control (IOCTL) requests. The IOCTL requests have very specific formatting requirements that must be reproduced with each application, adding a significant amount of effort and time to the development of a new application. Such applications must discover the hardware contents of the computer, including storage controllers and attached devices, and must utilize this information. This process is often requested for each project, and the implementation can be time-consuming and error prone.

Most applications that perform IOCTL requests and/or hardware scans use a similar method, but the continued reproduction of such operations leads to slight variations in the process as different projects use different baseline versions of code. In addition, as the code is refined, many projects are not updated with the fixed code, which can lead to the need to repeat debugging efforts.

Current solutions to such problems involve reproducing the device scan and IOCTL requests from one application to another. This is the methodology that most applications utilize. Some applications of the code do present an interface for other modules or applications to utilize in a shared manner. In such situations, however, the code is based on the reproduced device scan and/or the IOCTL request code.

One of the problems with these solutions is that such processes rely on the reproduction of the actual code that accomplishes the device scan and/or IOCTL request. Such techniques are error prone and must be copied into a new project, while ensuring compatibility with the new code. Additionally, the code must be integrated into the project's data structures. This process tends to introduce bugs, which must be fixed in each project.

The maintenance of the device scan and/or IOCTL request code, if not centralized, also presents a problem because many of the projects implemented do not utilize this particular portion of the code, which is fixed after the initial development is accomplished. Another issue inherent with current solutions is that it can take a very long time to produce a utility application because of the need to reproduce and copy the code. Aside from this basic work, many utility applications are relatively simple to implement. Finally, it is important to note that the worker code utilized implements certain and often repeated requests, which must be recreated in each project or may not be utilized at all, causing inefficient results.

BRIEF SUMMARY

The following summary of the invention is provided to facilitate an understanding of some of the innovative features unique to the present invention and is not intended to be a full description. A full appreciation of the various aspects of the invention can be gained by taking the entire specification, claims, drawings and abstract as a whole.

It is therefore one aspect of the present invention to provide for improved data-processing methods and systems.

The above and other aspects of the invention can be achieved as will now be briefly described. A data-processing system and method are disclosed, which generally includes a plurality of components connected to a bus within a data-processing apparatus utilizing one or more input/output interfaces (e.g., IOCTL) in communication with the bus. A dynamic interface is implemented, which includes a plurality of interface modules that permits varying data-processing applications to scan, identify and interface with the plurality of components utilizing the input/output interface, thereby increasing data-processing application development efficiency relative to one or more components within the data-processing system.

The dynamic interface can include, for example, a base MPT interface, an SCSI command interface, an RAID interface, and/or portable interface (e.g., portable MPT interface) for interfacing with the MPT components. Additionally, an OS specific input/output interface layer can be provided, in addition to a discovery module (e.g., OS Specific Discovery) that permits the identification and scanning of a specific component among the plurality of components. Components utilized include, for example, a controller associated with the data-processing apparatus. Additionally, the dynamic interface can be maintained with an electronic library of data-processing applications for interfacing with components of the data-processing apparatus. The dynamic interface also provides for a scan routine callable for identifying one or more components within the data-processing apparatus.

The systems and method disclosed herein can be implemented in the context of a shared library that interfaces with Fusion-MPT based controllers. Such a library can include a dynamic interface and a scan routine that can be readily called to identify controllers and other components in the data-processing apparatus (e.g., computer). Such a library also provides an interface that issues an IOCTL request to the controller. This interface implements the often reproduced work of issuing the IOCTL request, and also can implement a set of worker functions that provide a higher-level interface to components such as, for example, controllers. In this manner applications can take advantage of existing functionality. The library can be segmented into several sections such as, for example, operating system (OS) specific discovery code, operating system specific IOCTL request code, and interface cores. The interface cores provide an interface to a set of Fusion-MPT functions, such as, for example, a basic interface, a RAID function interface, and an interface that interfaces with functions specifically related to a Fibre Channel. In this manner, a large library of shared code (e.g., software modules) can be implemented in the context of a shared and/or dynamic library, so that applications can utilize the method that suits them the best.

BRIEF DESCRIPTION OF THE DRAWINGS

The accompanying figures, in which like reference numerals refer to identical or functionally similar elements throughout the separate views and which are incorporated in and form part of the specification, further illustrate embodiments of the present invention.

DETAILED DESCRIPTION OF THE INVENTION

The particular values and configurations discussed in these non-limiting examples can be varied and are cited merely to illustrate embodiments of the present invention and are not intended to limit the scope of the invention.

Figure 1:
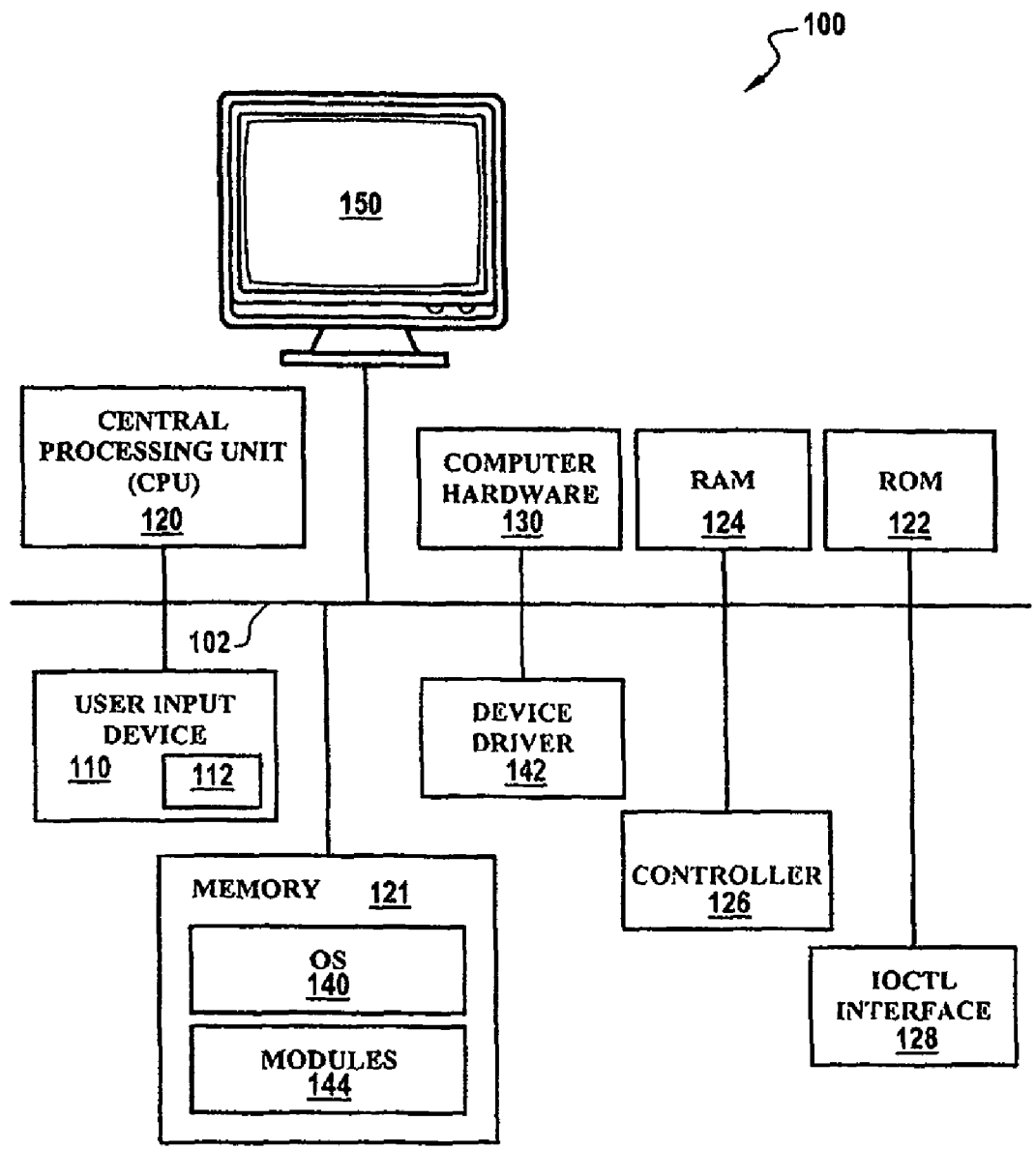
FIG. 1 illustrates a block diagram of a system in which a preferred embodiment of the present invention can be implemented.

For a further understanding of the present invention, reference is made to FIG. 1, which depicts a data-processing apparatus 100 in which an embodiment can be implemented. Data processing apparatus 100 of FIG. 1 generally includes a user input device 110, a central processing unit 120, computer hardware 130, and a monitor 150. The user input device 110 can be coupled to the central processing unit 120 wherein the central processing unit 120 is coupled to the computer hardware 130 and the operating system 140. User input device 110 can be implemented, for example, as a computer keyboard, a computer mouse, and so forth.

The central processing unit 120 is connected to a bus 102, which in turn can be connected to other system components, such as memory 121, Random Access Memory (RAM) 124, Read Only Memory (ROM) 124, a controller 126, and an input/output control (IOCTL) interface 128. Note that controller 126 can be implemented as one or more controller types. For example, controller 126 can be configured as Small Computer Systems Interface (SCSI) controller and/or other types of controllers. For illustrative and explanatory purposes, however, controller 126 can be considered to be a Small Computer Systems Interface (SCSI) controller.

System bus 102 can also be connected to other components of data processing apparatus 100, such as, for example, monitor 150, device driver 142 and user input device 110. The IOCTL interface 128 is generally associated with operating system 140. Note that device driver 142 can be implemented as an SCSI device driver, depending upon design considerations. Memory 121, which is coupled to bus 102, can communicate with the central processing unit 120 via bus 102. Operating system (OS) 140 can be stored as a module or series of software modules within memory 121 and processed via CPU 120. Note the term "module" is defied in greater detail herein.

The device driver 142 can be implemented as a software or instruction module stored in a memory, such as memory 121, which can be utilized to communicate with the controller 126. Thus, although device driver 142 is illustrated in FIG. 1 as a separate "block," it can be appreciated that device driver 142 can be implemented in the context of a module storable in a computer memory. Device driver 142 generally functions as a module or group of modules that communicates between OS 140 and the controllers described herein. Similarly, IOCTL interface 128, which is also depicted in FIG. 1 as constituting a separate "block", can form a part of OS 140 to allow for direct communication such as sending messages to and from device driver 142.

The operating system 140 is the master control program that runs the computer. It sets the standards for all application programs that run in the computer. Operating system 140 can be implemented as the software that controls the allocation and usage of hardware resources, such as memory 121, central processing unit 120, disk space, and other peripheral devices, such as monitor 150, user input device 110 and computer hardware 130. Examples of operating systems, which may be utilized to implement operating system 140 of apparatus 100, include Windows, Mac OS, UNIX and Linux.

Bus 102 can be implemented as a plurality of conducting hardware lines for data transfer among the various system components to which bus 102 is attached. Bus 102 functions as a shared resource that connects varying portions of data-processing apparatus 100, including the CPU 120 (i.e., a microprocessor), controllers, memory and input/output ports and so forth and enabling the transfer of information. Bus 102 can be configured into particular bus components for carrying particular types of information. For example, bus 102 can be implemented to include a group of conducting hardware lines for carrying memory addresses or memory locations where data items can be found, while another group of conducting hardware lines can be dedicated to carrying control signals, and the like.

The user input device 110 can include a plurality of device descriptor files 112. The device descriptor files 112 contain information related to the user input device, e.g. what type of device it is, who made the device, etc. The device descriptor files 112 can also contain user-defined fields called report descriptors. Report descriptors are strings of information that the operating system 140 can read. Report descriptors can be implemented, for example, as for passing useful information about the user input device 110 to the operating system 140 and/or a device driver 142. Such report descriptors are unique for each type of user input device.

Note that embodiments of the present invention can be implemented in the context of modules. Such modules may constitute hardware modules, such as, for example, electronic components of a computer system. Such modules may also constitute software modules. In the computer programming arts, a software module can be typically implemented as a collection of routines and data structures that performs particular tasks or implements a particular abstract data type.

Software modules generally are composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. The term module, as utilized herein can therefore refer to software modules or implementations thereof. Such modules can be utilized separately or together to form a program product that can be implemented through signal-bearing media, including transmission media and recordable media.

Figure 3:
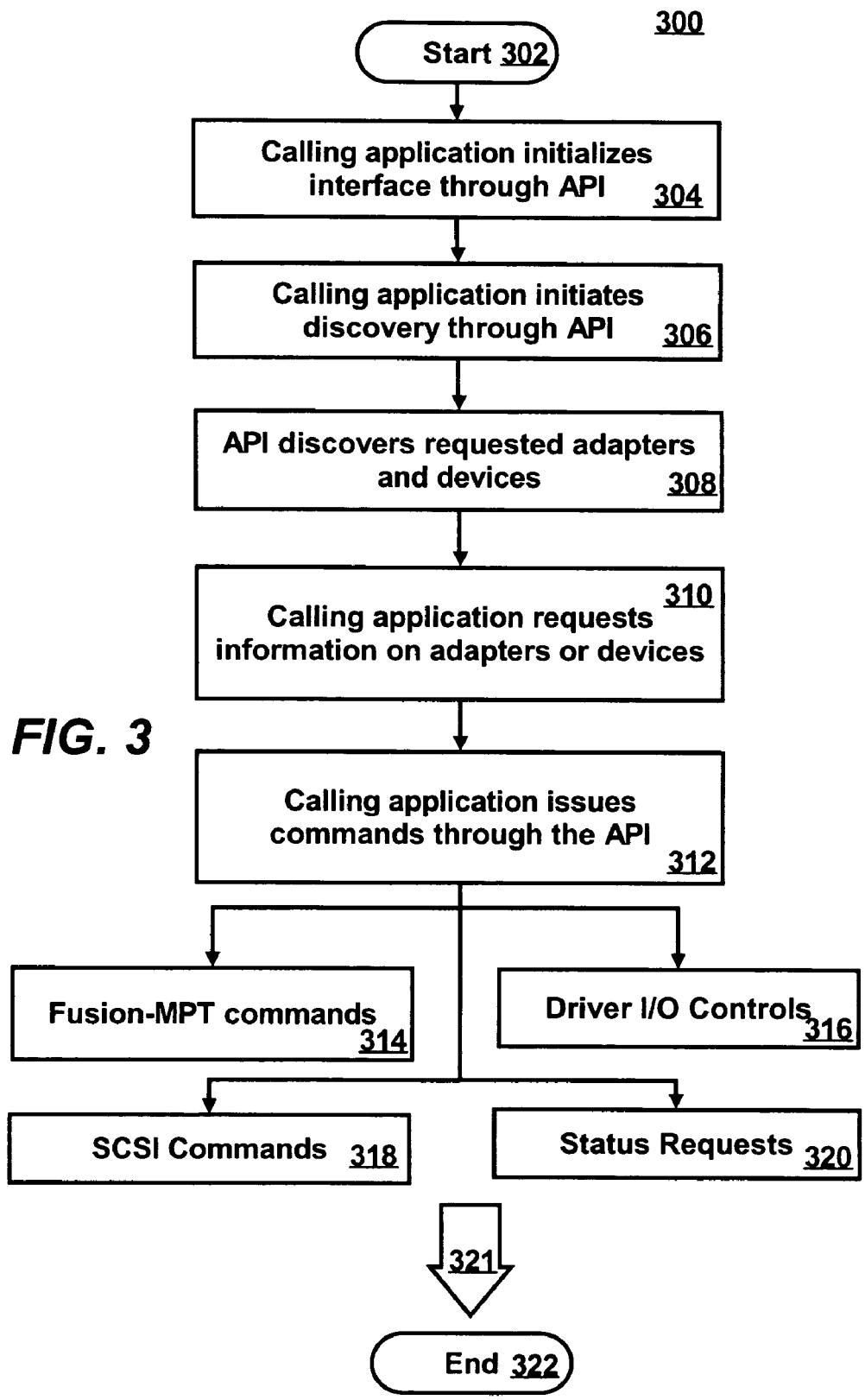
FIG. 3 illustrates a high-level flow chart of logical operational steps that can be implemented in accordance with a preferred embodiment.

The methodology depicted in FIG. 3, for example, can be implemented as one or more such modules. Such modules can be referred to also as "instruction modules" and may be stored within a memory of a data-processing system such as memory 121 of FIG. 1. Modules 144 depicted in FIG. 1 represent such instruction modules. Such instruction modules may be implemented in the context of a resulting program product (i.e., program "code"). Note that the term module and code can be utilized interchangeably herein to refer to the same device or media.

Figure 2:
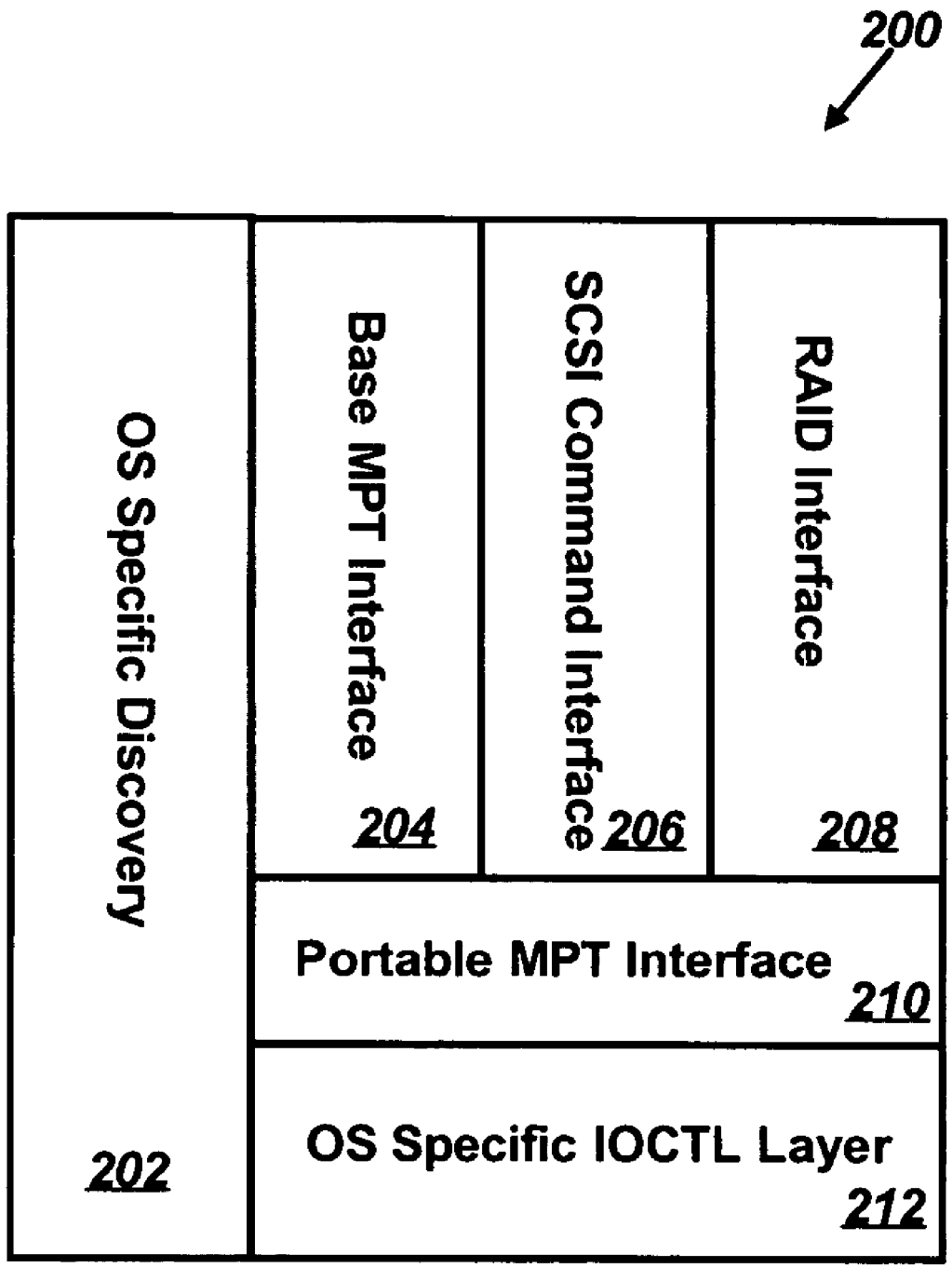
FIG. 2 illustrates a block diagram of a system that can be implemented in accordance with a preferred embodiment, wherein the varying blocks illustrated thereof demonstrates possible interfaces and how they interact with one another.

FIG. 2 illustrates a block diagram of a data-processing system 200 that can be implemented in accordance with a preferred embodiment. System 200 includes an OS (Operating System) specific discovery section 202, a base MPT interface 204, an SCSI command interface 206, a redundant disk array interface 208 (e.g., a RAID interface), along with a portable MPT interface 210 and an OS specific IOCTL layer 212. System 200 can be implemented in association with data-processing apparatus 100 depicted in FIG. 1. The redundant array interface 208 is generally based on a methodology of concatenating multiple drives into a single logical storage unit. Each drive's storage space is partitioned into stripes, which can be, for example, as small as one sector (e.g., 512 bytes) or as large as several megabytes. These stripes are then arranged into an interleaved configuration, so that the combined space is composed alternately of stripes from each drive. In effect, the storage space of the drives is shuffled like a deck of cards.

System 200 generally includes, for example, a number of components such as those depicted in FIG. 1, which are connected to a bus 102 within data-processing apparatus 100 utilizing one or more input/output interfaces (e.g., IOCTL interface 128) in communication with bus 102. This is really more of a way for the software modules 144 to communicate with the driver 142. A dynamic interface can therefore be implemented, which includes a plurality of interface modules, such as, for example, base MPT interface 204, SCSI command interface 206, RAID interface, 208 and/or portable MPT interface 210 that permits varying data-processing applications to scan, identify and interface with the data-processing components utilizing the input/output interface 128, via the device driver 142, thereby increasing data-processing application development efficiency relative to one or more components within the data-processing system 100.

Additionally, as indicated above the OS specific input/output interface layer 212 can be provided, in addition to the discovery module or OS Specific Discovery code 202 that permits the identification and scanning of a specific component among the plurality of components of the data-processing apparatus 100. Components utilized can include, for example, a controller (e.g., SCSI controller) associated with the data-processing apparatus 100. Additionally, the dynamic interface can be maintained with an electronic library of data-processing applications for interfacing with components of the data-processing apparatus 100. The dynamic interface also provides for a scan routine callable for identifying one or more components within the data-processing apparatus 100.

System 100 can be implemented in the context of a shared library that interfaces with Fusion-MPT based controllers. Note that as utilized herein the term Fusion-MPT refers generally to a type of message passing architecture that provides an open programming interface for developers and is based upon a single binary device driver. Such a library can include the dynamic interface described above in association with a scan routine (e.g., OS specific discovery code 202) that can be readily called to identify controllers and other components in the data-processing apparatus 100. Such a library can function as an interface that issues one or more IOCTL requests to controller 126. This interface implements the often reproduced work of issuing IOCTL requests and also can implement a set of worker functions that provide a higher-level interface to components such as, for example, controllers 126, device driver 142, computer hardware 130, and so forth.

In this manner applications can take advantage of existing functionality. The library can be segmented into several sections such as, for example, operating system (OS) specific discovery code, operating system specific IOCTL request code, and interface cores. The interface cores provide an interface to a set of Fusion-MPT functions, such as, for example, a basic interface, a RAID function interface, and an interface that interfaces with functions specifically related to a Fibre Channel. In this manner, a large library of shared code (e.g., software modules) can be implemented in the context of a shared and/or dynamic library, so that applications can utilize the method that suits them the best.

FIG. 3 illustrates a high-level flow chart 300 of logical operational steps that can be implemented in accordance with a preferred embodiment. As indicated at block 302, the process can be initiated. Next, as depicted at block 304 a calling application can initialize the interface of system 200 through API. Note that the acronym "API" generally refers to an application programming interface. API is a method that permits an application to use a functionality centrally located within a data-processing apparatus or system. This leads to the reuse of code. Additionally, many applications repeat much of the same work, such as combining three pieces of data to produce one piece of useful information. The most commonly gathered information can be placed in an API, so that any application which uses the API can make use of the common information gathering functionality.

Recall that the interface depicted in system 200 can include, for example, base MPT interface 204, SCSI command interface 206, RAID interface 208 and/or portable interface 210. The calling application then initiates discovery through API, as indicated at block 306. Discovery can occur via the OS specific discovery module or code 202 of system 200. Thereafter, as illustrated at block 308, the API can discover requested adapters and devices, such as those associated with data processing apparatus 100 as depicted in FIG. 3.

Next, the calling application can request information concerning the adapters and/or devices associated with data processing apparatus 100. Thereafter, as indicated at block 312 the calling application can issue commands through the API. Such commands can be one or more of, for example, Fusion-MPT commands 314, driver I/O controls 316, SCSI commands 318 and/or status requests 320, depending upon particular implementations and embodiments and user goals. Following completion of one or more such commands, as indicated by arrow 321, the process can then terminate as illustrated by block 322.

By implementing such a system and/or methodology, a shared device scan and IOCTL request codes (i.e. modules) make it easier to write new applications, and ultimately permits such utilities to be more reliable due to the use of existing modules or code that has been debugged and maintained. Worker functions also permit the efficient implementation of new applications by providing a simpler interface for issuing frequently needed requests. Additionally, the shared library feature described herein can be designed for portability to other operating systems by simply replacing the operating system specific cores. The device scan code is typically more advanced than the code utilized by existing applications, thereby allowing the calling application to filter certain controllers, while not scanning devices or for operating system volumes, while scanning for particular RAID volumes, depending upon design considerations. The IOCTL request code generally utilizes a much simpler data structure interface, which makes it easier to write and prepare applications.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A data-processing system, comprising:
   a plurality of components connected to a bus within a data-processing apparatus utilizing at least one input/output interface in communication with said bus; and
   a dynamic interface comprising a plurality of interface modules that permits varying data-processing applications to scan, identify and interface with said plurality of components utilizing said at least one input/output interface; and
   a discovery module in association with said dynamic interface and said plurality of components that permits the identification and scanning of a specific component among said plurality of components, thereby increasing data-processing application development efficiency relative to at least one component among said plurality of components within said data-processing system.

2. The system of claim 1 wherein said dynamic interface comprises a base MPT (Message Passing Technology) interface.

3. The system of claim 1 wherein said dynamic interface comprises an SCSI command interface.

4. The system of claim 1 wherein said dynamic interface comprises a redundant disk array interface.

5. The system of claim 4 wherein said redundant disk array interface comprises a RAID interface.

6. The system of claim 2 wherein said dynamic interface comprises a portable interface for interfacing with at least one MPT component among said plurality of components.

7. The system of claim 1 further comprising an operating system specific input/output interface layer.

8. The system of claim 7 wherein said specific input/output interface layer comprises a controller associated with said data-processing apparatus.

9. The system of claim 8 wherein said dynamic interface provides a scan routine callable for identifying at least one component of said plurality of components within said data-processing apparatus.

10. A data-processing system, comprising:
    a plurality of components connected to a bus within a data-processing apparatus utilizing at least one input/output interface in communication with said bus comprises a controller associated with said data-processing apparatus;
    a dynamic interface comprising a plurality of interface modules that permits varying data-processing applications to scan, identify and interface with said plurality of components utilizing said at least one input/output interface, thereby increasing data-processing application development efficiency relative to at least one component among said plurality of components within said data-processing system, wherein said dynamic interface comprises at least one of the following interfaces:
    a base MPT (Message Passing Technology) interface; an SCSI command interface;
    a redundant disk array interface;
    a portable interface for interfacing with at least one MPT component among said plurality of components; and wherein said dynamic interface provides a scan routine callable for identifying at least one component of said plurality of components within said data-processing apparatus.

11. The system of claim 10 wherein said redundant disk array interface comprises a RAID interface.

12. The system of claim 10 further comprising an operating system specific input/output interface layer.

13. A data-processing method, comprising:
   interconnecting a plurality of components to a bus within a data-processing apparatus utilizing at least one input/output interface in communication with said bus; and
   providing a dynamic interface comprising a plurality of interface modules that permits varying data-processing applications to scan, identify and interface with said plurality of components utilizing said at least one input/output interface
   associating an operating system specific input/output interface layer with said dynamic interface and said plurality of components;
   providing a discovery module that permits the identification and scanning of a specific component among said plurality of components, wherein said discover module is associated with said operating system specific input/output interface, said dynamic interface and said plurality of components; and
   maintaining said dynamic interface within an electronic library of data-processing applications for interfacing with said plurality of components of said data-processing apparatus, thereby increasing data-processing application development efficiency relative to at least one component among said plurality of components within said data-processing system.

14. The method of claim 13 wherein said dynamic interface comprises:
   a base MPT (Message Passing Technology) interface; and
   a portable interface for interfacing with at least one MPT component among said plurality of components.

15. The method of claim 13 wherein said dynamic interface comprises an SCSI command interface.

16. The method of claim 13 wherein said dynamic interface comprises a redundant disk array interface.

17. The method of claim 16 wherein said redundant disk array interface comprises a RAID interface.

* * * * *